(12) United States Patent
Goslin et al.

(10) Patent No.: US 11,311,804 B2
(45) Date of Patent: *Apr. 26, 2022

(54) INCORPORATING AND COORDINATING MULTIPLE HOME SYSTEMS INTO A PLAY EXPERIENCE

(71) Applicant: Disney Enterprises, Inc., Burbank, CA (US)

(72) Inventors: Michael P. Goslin, Sherman Oaks, CA (US); Eric C. Haseltine, Silver Spring, MD (US); Joseph L. Olson, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 16/781,819

(22) Filed: Feb. 4, 2020

(65) Prior Publication Data
US 2020/0171384 A1 Jun. 4, 2020

Related U.S. Application Data

(63) Continuation of application No. 15/015,907, filed on Feb. 4, 2016, now Pat. No. 10,583,361.

(51) Int. Cl.
*A63F 13/428* (2014.01)
*A63F 13/32* (2014.01)
*A63F 13/28* (2014.01)

(52) U.S. Cl.
CPC .......... *A63F 13/428* (2014.09); *A63F 13/28* (2014.09); *A63F 13/32* (2014.09)

(58) Field of Classification Search
CPC .............................. A63F 13/428; A63F 13/28
See application file for complete search history.

(56) References Cited

U.S. PATENT DOCUMENTS

2016/0067608 A1* 3/2016 Yim .................. A63F 3/00643
463/33

* cited by examiner

*Primary Examiner* — Yingchuan Zhang
(74) *Attorney, Agent, or Firm* — Patterson + Sheridan, LLP

(57) ABSTRACT

Techniques to synchronize changes in physical and virtual environments. An environmental change that will occur during a specified playback event within an interactive game is determined. An amount of time sufficient to permit an environmental device to effect a desired change in the physical environment before the specified playback event occurs is determined. The environmental device is controlled based on the amount of time, to effect the desired change synchronously with the environmental change.

20 Claims, 10 Drawing Sheets

INCORPORATING AND COORDINATING MULTIPLE HOME SYSTEMS INTO A PLAY EXPERIENCE

CROSS-REFERENCE TO RELATED APPLICATIONS

This application is a continuation of co-pending U.S. patent application Ser. No. 15/015,907, filed Feb. 4, 2016, and which is herein incorporated by reference in its entirety.

BACKGROUND

Field of the Invention

The present invention generally relates to entertainment systems, and more specifically to techniques for controlling a plurality of devices to provide an immersive user experience.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Modern technologies such as augmented reality devices enable game developers to create games that exist outside of traditional video game platforms (e.g., where the virtual world is solely output through a display device). Using such technologies, virtual characters and other virtual objects can be made to appear as if they are present within the physical world. In such augmented reality experiences, it is generally preferable for the virtual character to be rendered with realistic dimensions and positioning, in order to enhance the illusion that the characters are truly present within the physical world.

SUMMARY

Embodiments provide techniques to integrate environmental devices into a play experience to synchronize changes in physical and virtual environments. Embodiments include determining an environmental change in an interactive game that will occur during a specified playback event within the interactive game, prior to the specified playback event occurring within the interactive game. Embodiments also include determining an amount of time before the specified playback event is to occur, where the amount of time is sufficient to permit a first one or more environmental devices to at least substantially effect a desired change in the physical environment before the specified playback event occurs. Embodiments also include, prior to the specified playback event occurring within the interactive game, at least substantially effecting the desired change in the physical environment synchronously with the environmental change in the interactive game, by controlling the first one or more environmental devices based on the amount of time.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
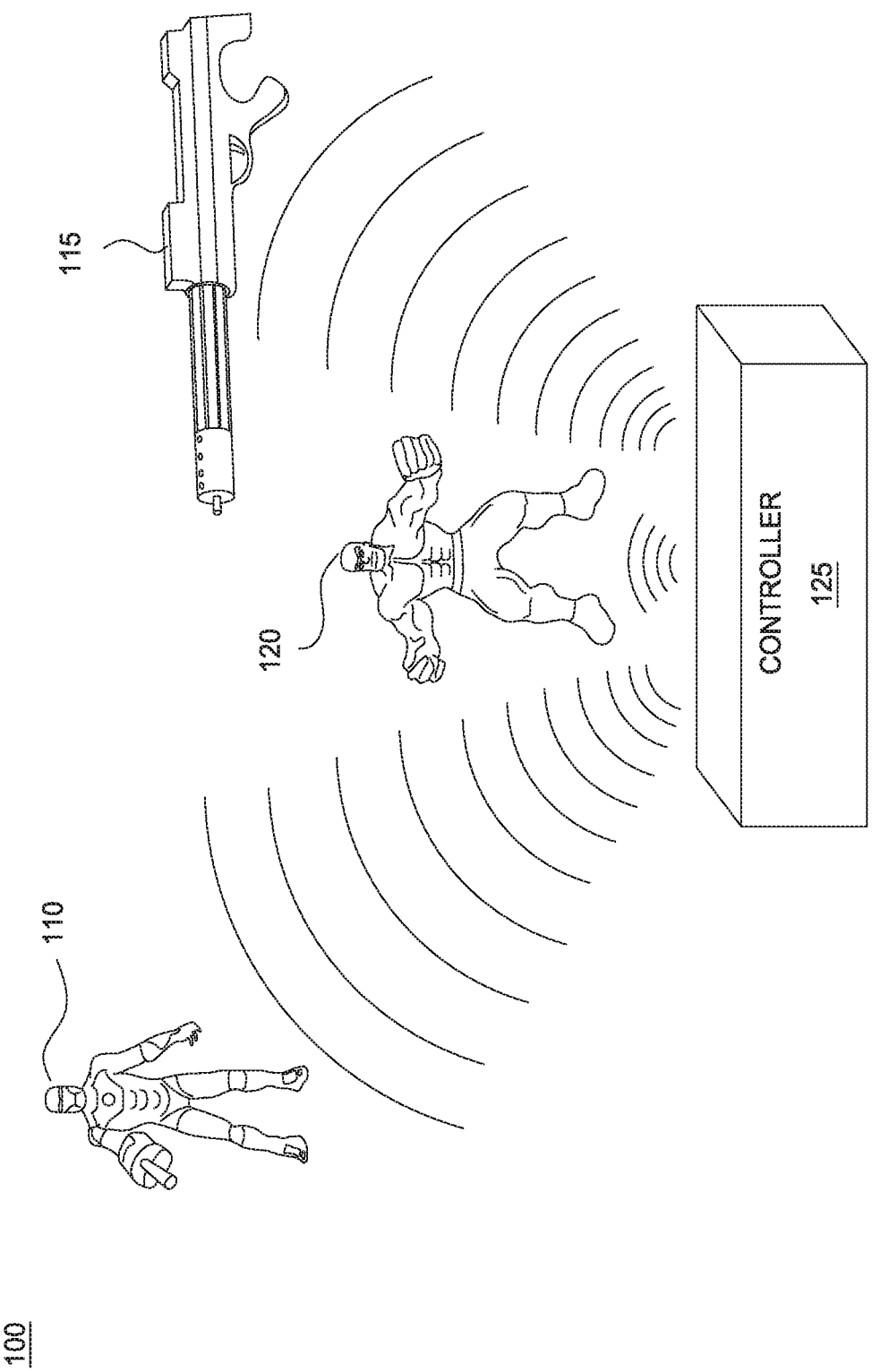
FIG. 1 illustrates a playtime environment in which a controller is instructing interactive devices, according to one embodiment described herein.

Generally, embodiments described herein provide techniques for controlling devices in a synchronized fashion. Embodiments include determining one or more environmental devices are available within a physical environment. For instance, the environmental devices could include window covers, illumination devices, temperature control devices and the like. A first instance of audiovisual content that is playing within the physical environment is detected.

Examples of audiovisual content include, without limitation, video content (e.g., streaming movie content), video game content and augmented reality game content. Embodiments determine an environmental condition at a first playback position within the first instance of audiovisual content. For instance, embodiments could analyze metadata for an instance of video content playing within the physical environment to determine that the video frames at a current playback position of the video content depict a dark and snowy arctic scene. Embodiments could then control the one or more environmental devices within the physical environment during playback of the first playback position within the first instance of audiovisual content, based on the determined environmental condition. For example, a temperature control device could be controlled in order to lower the temperature of the physical environment. As another example, embodiments could control one or more illumination devices within the physical environment to dim the level of illumination within the physical environment. Doing so enhances the user's experience during the playback of the audiovisual content.

Particular embodiments are described herein with respect to an immersive storytelling environment in which a story is played back through the interaction of storytelling devices (also referred to as interactive devices). More specifically, embodiments may use various storytelling devices, each capable of producing some auditory and/or visual effect, to create an immersive and interactive storytelling experience for a user. Such a system may include a variety of storytelling devices and a controller, connected via a network (e.g., an RF communications network). Each storytelling device generally represents any device capable of enhancing a storytelling experience, in response to user input (or some stimuli) a current context of a story. For instance, the controller device could configure the storytelling devices with stimulus and response information, based on a current context of a story. As an example, the controller device could configure a particular storytelling device to generate audiovisual messages responsive to a certain stimulus event (e.g., a user performing a particular action), and to perform another action responsive to other stimulus (e.g., the user not performing the particular action within a predefined window of time). Generally, the controller may be one of the plurality of storytelling devices, or the controller could be a stand-alone device (e.g., a computing device executing a control application).

Generally, each of the storytelling devices can have different capabilities in terms of audio output devices and audio processing and storage capabilities. For instance, a first device may include multiple higher quality speakers and a greater amount of audio processing and storage resources, while another storytelling device can include a relatively limited speaker and relatively limited audio processing and storage resources. This could be because, for instance, higher quality speakers, processing and storage resources are generally more expensive, and it can be desirable for economic reasons for certain storytelling devices to be lower cost devices.

As a result, certain audio effects may have a higher quality sound when played using the hardware of a particular storytelling device, relative to when the audio effect is played using another storytelling device with more limited hardware. As such, embodiments can tailor audio output during a storytelling experience such that that an optimal device is selected for particular sound effects during the story. For instance, in an Iron Man® themed story, a particular audio effect could represent Jarvis' voice giving instructions and updates to the player as part of the story. As the character Jarvis is not represented by any of the storytelling devices used to play out the story, it could be thematically appropriate to output the audio effect representing Jarvis' voice through any of multiple storytelling devices used in the story. As such, embodiments could select one of the storytelling devices best suited to output the audio effect with the highest quality (e.g., the storytelling device having the speakers, processing and storage capabilities best suited for outputting the particular audio effect) and could instruct the selected device to output the audio effect. Moreover, such devices can be selected dynamically throughout the story, as devices may enter and exit the story playback for a variety of reasons (e.g., a new device is brought into the physical area where the story is being played out, a device runs out of battery power, etc.).

Additionally, in some cases the storytelling devices can be configured to work in unison to output a particular sound effect. For instance, a single sound effect could be output on multiple devices in unison in order to create a stereophonic or surround-sound experience for the user. In doing so, a slight time delay can be introduced in the playback of the sound effect across the multiple devices, to avoid phase cancellation between the sound effects being output by the devices. As another example, the devices can be configured to output the sound effect with a more significant time delay in order to create a particular auditory effect for the user. For example, in a story that simulates the user being within a bee hive, the various storytelling devices could each output the sound of a bee buzzing with a time delay in between the output of each of the devices, such that the sound of the bee buzzing appears to move throughout the physical environment. Thus, if the user is positioned between the various storytelling devices used in the playback of the story, the sound of the bee buzzing could appear to encircle the user, thus creating an immersive auditory experience for the user and enhancing the realism of the story.

Additionally, embodiments can include augmented reality devices together with various storytelling devices as part of an augmented reality gaming environment. As used herein, an augmented reality device refers to any device capable of displaying a real-time view of a physical, real-world environment while altering elements within the displayed view of the environment. As such, unlike a virtual reality device which displays a view of virtual world, an augmented reality device displays a view of the real world but augments elements using computer graphics technology. Such an augmented reality device may include a camera device (or multiple camera devices) used to capture a view of the real-world environment and may further include computer software and/or hardware configured to augment elements of the captured scene. For example, an augmented reality device could capture a series of images of a coffee cup sitting on top of a table, modify the series of images so that the coffee cup appears as an animated cartoon character and display the modified series of images in real-time to a user. As such, when the user looks at the augmented reality device, the user sees an augmented view of the physical real-world environment in which the user is located.

Additionally, the software could identify a first physical object within the visual scene captured by camera devices of the augmented reality device. For instance, embodiments could analyze the visual scene to determine the border edges of objects within the visual scene, and could use these border edges in order to identify one or more physical objects existing within the visual scene. Of note, as the captured visual scene represents a three-dimensional space (e.g., a physical environment captured using a camera of the augmented reality device), embodiments may be configured to estimate a three-dimensional space occupied by each of the physical objects within the captured scene. That is, the software could be configured to estimate the three-dimensional surfaces of physical objects within the captured scene.

In response to detecting a known physical object with the visual scene, the software could render one or more virtual characters based on the physical object's appearance within the captured frames. As an example, the augmented reality software could create a three-dimensional representation of the physical environment and could create a virtual object or character to insert within the three-dimensional representation. The software could position the created virtual object or character at a position within the three-dimensional scene, based on the depiction of the physical object within the captured frames. For example, the software could determine that the physical object is resting on a particular surface within the physical environment (e.g., a table surface, a floor, etc.), based on data about the size and shape of the physical object and the object's appearance within the captured frames. Upon identifying the physical surface, the software could position the virtual object or character within the three-dimensional scene, so that the virtual object or character is resting on the identified surface. Doing so creates a more realistic experience for the user.

Additionally, the software could scale the size of the virtual object or character based on the depiction of the physical object within the captured frames. For instance, the software could store predefined geometric data for the physical object, specifying a shape and dimensions of the physical object. The software could then use such information to determine how to size the virtual object or character in the three-dimensional scene. For example, assume the virtual object is a spherical object that is 12 inches in diameter. The software could determine a scaling for the virtual object based on the size of the physical object within the captured frames and the predefined geometric data specifying the physical object's known dimensions. As another example, the software could create a virtual character and could scale the size of the virtual character to life-size dimensions (e.g., the size of an average human being), using the size of the physical object within the captured frames and the predefined geometric data specifying the physical object's known dimensions. Doing so enables the augmented reality software to create a realistic and consistent depiction of the virtual object or character.

Generally, the augmented reality device can continue rendering frames of the three-dimensional scene interlaced with the frames captured by the camera sensors of the augmented reality device, in real-time, as the device (and the user of the device) moves throughout the physical environment. Advantageously, doing so provides a more immersive augmented reality experience for the user, as the user can paint the surfaces of objects within the augmented reality world and the user's painting will persist and remain accurate to the depicted physical environment, even when the environment is viewed from different perspectives using the augmented reality device.

An example will now be discussed with respect to FIG. 1, which illustrates a playtime environment in which a controller is instructing interactive devices to perform an effect, according to one embodiment described herein. As shown, the system 100 includes an Iron Man® action figure 110, a Star Wars® blaster rifle 115, a Hulk® action FIG. 120, and a controller device 125. Here, the toys 110, 115 and 120 are generally capable of producing audiovisual effects (e.g., audio output, light effects, movement effects such as vibration, etc.). In one embodiment, the toys 110, 115 and 120 may be configured with an action disc device (e.g., device 200 shown in FIG. 2 and discussed in more detail below). Of note, while various examples are discussed herein with respect to the toy devices 110, 115 and 120, it is broadly contemplated that these techniques can be utilized with any number of devices and any types of devices, consistent with the functionality described herein.

However, while the toys 110, 115 and 120 are capable of producing audiovisual effects, the toys 110, 115 and 120 may not be configured with logic to determine when conditions in the physical environment indicate a particular effect should be performed. This may be due to, in part, the cost and complexity of configuring each toy 110, 115 and 120 with the logic and hardware resources to detect stimuli in the physical environment and to perform a contextually appropriate audiovisual effect in response synchronously with other devices. As such, the toys 110, 115 and 120 could be configured to receive commands (e.g., from controller 125) and to perform an audiovisual effect(s) responsive to the received commands. Doing so allows the toys 110, 115 and 120 to be produced much more economically, while maintaining the capability to perform audiovisual effect(s) as part of a storytelling or playtime experience.

For example, as part of a Star Wars® storytelling experience, the storyline could indicate that devices within the physical environment should play a particular sound effect when the user performs a predefined gesture to use the "force." As such, the controller 125 could monitor the user's behavior to detect when the user has performed the predefined gesture. For example, the controller 125 could use one or more camera devices (e.g., within the controller devices 125, within one or more of the toys 110, 115 and 120, etc.) to monitor the user's movement within the physical environment. As another example, the user could wear an article (e.g., a bracelet) configured with an accelerometer device and capable of reporting data describing the user's movement to the controller device 125.

Upon detecting the user has performed the predefined gesture, the controller 125 could broadcast a command to the toy devices 110, 115 and 120, instructing the toy devices 110, 115 and 120 to synchronously perform an audiovisual effect. Such a command could be broadcast, for example, via a radio-frequency transmitter, an infrared emitter, an ultrasound transmitter, and so on. More generally, any communications protocol may be used for the communication between the controller and the toy devices 110, 115 and 120, consistent with the functionality described herein.

The toy devices 110, 115 and 120 could then receive the command and could perform the specified audiovisual effect in synchrony. For example, in the event the command specifies to play a particular sound effect, each of the toy devices 110, 115 and 120 could output the particular sound effect in synchrony with the other toy devices, thereby creating an improved sensorial experience for the user, relative to any of the toy devices 110, 115 and 120 playing the sound effect individually. Here, the sound effect could be, e.g., a sampled sound effect or a function-generated sound effect. Moreover, as discussed above, by playing the sound effect synchronously with one another, the toy devices 110, 115 and 120 can compensate for each other's weaknesses (e.g., a particular toy device being capable of outputting sounds within a limited frequency range), thereby producing an improved sound effect and sensorial immersion for the user.

While any number of toy devices can be used, the sense of immersion experienced by the user generally scales with the number of devices performing audiovisual effects in synchrony. For example, the controller 125 could detect when the user pulls the trigger to fire the blaster gun 115, and in response, could broadcast a command to all of the toy devices 110, 115 and 120 to output the sound effect of the blast being fired. Additionally, the controller 125 could instruct the toy devices 110, 115 and 120 to perform additional audiovisual effects, such as flashing lights and movements, in response to the user firing the blaster. Doing so helps to overload the user's senses, thereby creating a more immersive and realistic playtime experience.

Generally, a variety of techniques may be used to configure the toy devices 110, 115 and 120 to synchronously output the audiovisual effect. In one embodiment, the toy devices 110, 115 and 120 could be configured to output the audiovisual effect immediately upon receiving the command from the controller 125. Such an embodiment may be preferable when the toy devices 110, 115 and 120 receive the command at substantially the same time and when the toy devices 110, 115 and 120 take substantially the same amount of time to process the command and to perform the corresponding audiovisual effect. As another example, each of the toy devices 110, 115 and 120 (as well as the controller 125) could maintain an internal clock whose time is synchronized to the internal clock of the other toy devices, and the command transmitted by the controller 125 could specify a time at which to perform the audiovisual effect. Generally, any technique suitable for use in synchronizing the internal clocks may be used, consistent with the present disclosure. Examples of such techniques include, without limitation, Network Time Protocol (NTP), Precision Time Protocol (PTP), Reference Broadcast Time Synchronization, and so on.

Additionally, the controller 125 could be configured to selectively playback certain audio effects on the devices 110, 115 and 120, based on which device is best suited for the playback of each particular audio effect. For instance, a particular Iron Man® themed story could include audio effects representing dialogue from Jarvis, where Jarvis is not directly represented by any of the storytelling devices 110, 115 and 120 used in the playback of the story. As such, the controller 125 could select one of the storytelling devices 110, 115 and 120 that is best suited to output the audio effect with the highest quality sound. Thus, the controller 125 could determine that the toy blaster rifle 115 has the optimal speaker configuration and audio processing capabilities to output the sound effects representing Jarvis' dialogue and could transmit the corresponding audio data to the blaster rifle 115 for output.

Of note, the controller 125 can be configured to dynamically determine the optimal storytelling device(s) for outputting a particular sound effect, as the available storytelling devices can change from story to story and can even change within the playback of a single story. For example, during the playback of a particular story, the Iron Man® action figure 110 could run low on battery power and could be removed from the story as a result. As such, the controller 125 could remove the Iron Man® action figure 110 from consideration when subsequently placing audio effects. As another example, the user's friend could visit the user's house and could bring a fourth storytelling device into the playback of the story. As such, the controller 125 could consider the fourth storytelling device in addition to the devices 110, 115 and 120 when searching for an optimal device to output subsequent audio effects.

Figure 2:
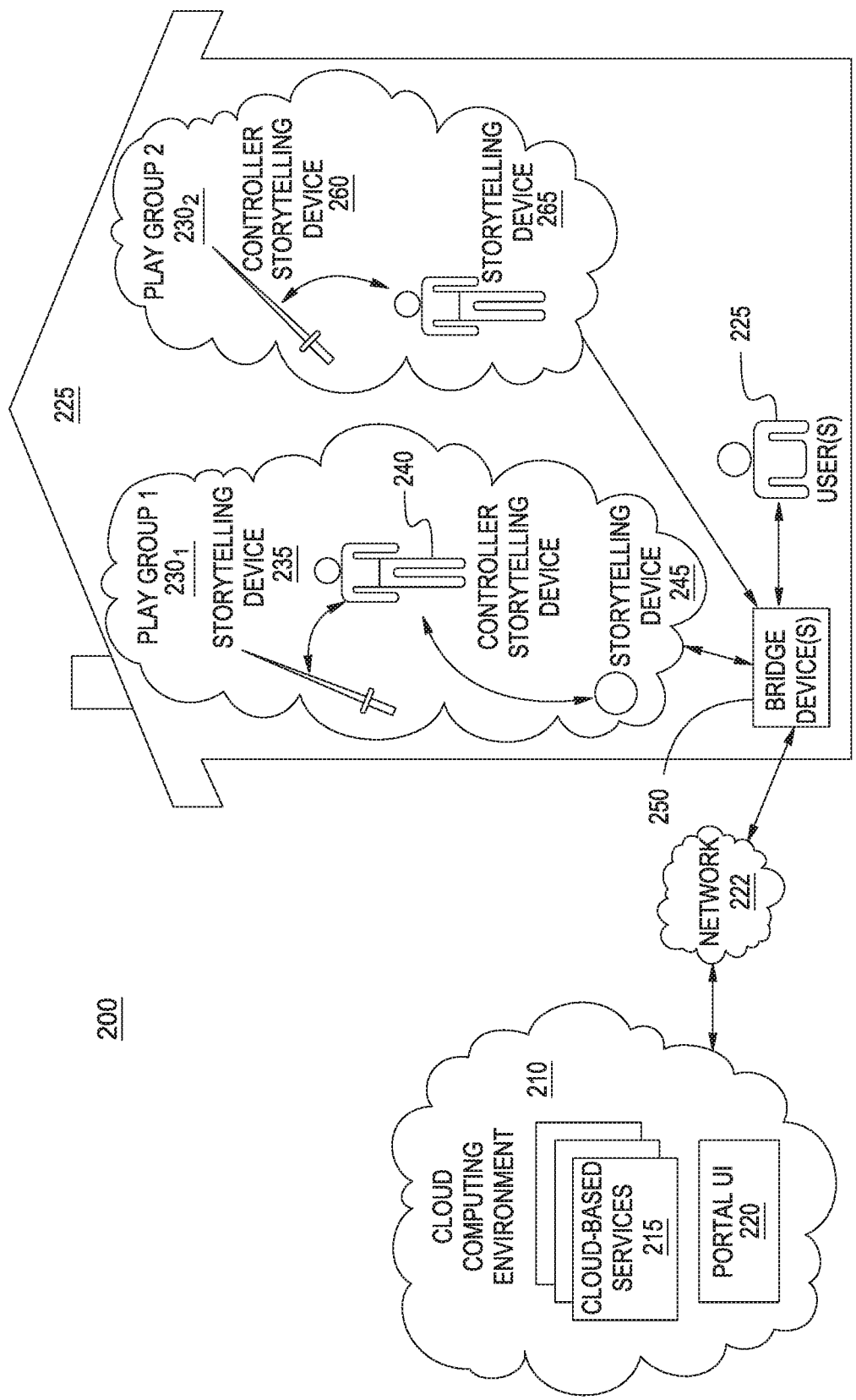
FIG. 2 illustrates a storytelling environment with a plurality of playgroups, according to one embodiment described herein.

FIG. 2 illustrates an example storytelling environment, according to one embodiment. As shown, the environment 200 includes a cloud computing environment 210 and a home environment 225, interconnected via network 222. The home environment 225 includes two playgroups $230_{1-2}$ of storytelling devices, as well as a user(s) 255 and a bridge device(s) 250. Here, the user may connect to the bridge device 250 via an application (e.g., executing on a mobile device, rendered within a web browser, etc.). The cloud computing environment 210 hosts a plurality of services 215 and a portal user interface 220.

Generally, cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access information and the services 215 from any computing system attached to a network connected to the cloud (e.g., the Internet).

Each playgroup $230_{1-N}$ generally represents a set of storytelling devices involved in a unique storytelling or playtime experience. For instance, the playgroup 2301 represents a science fiction-themed storytelling experience and includes a light sword storytelling device 235, an action figure controller storytelling device 240, and a trainer storytelling device 245. Likewise, the playgroup 2302 also represents a science fiction-themed storytelling experience and includes a light sword controller storytelling device 260 and an action figure storytelling device 265. More generally, however, the playgroups may contain any number of storytelling devices of any number of different themes and types.

Generally, the playgroups 230 include storytelling devices within a particular physical location (e.g., a room of the house environment 225). That is, it may be preferable for a storytelling experience to only interact with storytelling devices within its immediate physical proximity (e.g., within the same room), as to do otherwise can potentially create security and other problems during the storytelling experience. A number of different techniques may be used to determine which storytelling devices are within immediate physical proximity of one another. For example, one or more of the storytelling devices could emit a first signal (e.g., an infrared signal) and the other storytelling devices could be configured to transmit a response (e.g., a radio frequency signal (RF)) upon receiving the first signal. The storytelling device(s) could then receive the responses from the other storytelling devices and could create a playgroup 230 that includes the other storytelling devices as well as the one or more storytelling devices.

Generally, it is advantageous for the first signal to be transmitted using a technique that does not readily pass through barriers such as the walls of a house (e.g., emitting infrared light), so as to detect only nearby storytelling devices that are within the same physical environment as the storytelling device. That is, while particular signals (e.g., RF signals) may be suited for inter-device communications, these signals may not be ideal for detecting nearby storytelling devices as they may readily permeate through barriers such as the walls of the house. Doing so helps to ensure that a storytelling experience will not make use of storytelling devices in different rooms of a residence or potentially within different residences altogether.

As shown, the devices 240 and 260 have been elected as controller devices within the playgroups $230_{1-2}$. Generally, a controller device configures each of the storytelling devices within a playgroup to perform certain actions in response to a detected stimulus event and a current context of the story being told. Since acting as a controller device may result in more processing and data transmissions operations, serving as the controller device may also consume more battery power. As such, when two or more devices capable of serving as the controller device are present within a playgroup 230, embodiments can consider the current battery charge and battery capabilities of the capable devices when selecting one of the devices to serve as the controller.

As discussed above, devices can join and leave the playgroups 230 during the playback of a story. As such, the controller devices 240 and 265 can be configured to dynamically determine an optimal device(s) for the playback of a particular audio effect and can optimize the audio effect for playback on the determined device, based on the devices currently active within the respective playgroup 230. Doing so allows audio effects to be played back with the highest sound quality possible using the available devices, thereby enhancing the user experience during the story.

The story may include a number of different contexts in a temporal order, and the playback of the story may advance from one context to the next until the last context is reached and the storytelling experience is complete. However, while the story may be linear in progression, this is not necessary. For example, a story could have different branches, where the story can proceed down one of many possible arcs. For instance, arcs could be randomly selected, selected based on a user's request (e.g., the user specifying which arc should be taken), selected based on the user's actions (e.g., the user manages to "rescue" one of the fictional characters in the story), selected based on the user's history of actions (e.g., whether the user is trending towards the "dark side" in a science fiction storyline), and so on. Moreover, the story may be modified dynamically during playback based on various actions, such as one of the storytelling devices becoming unavailable (e.g., losing power, leaving the physical environment, etc.) or a new storytelling device being introduced to the environment (e.g., the user's friend comes over to play, bringing one or more new storytelling devices with him).

Additionally, the controller may maintain state information and control game logic for the playgroup 230. For example, playgroup 2301 could be playing out a story in which a user is asked by the action figure device 240 to deflect virtual laser beams fired from the trainer device 245, using the light sword device 235. Here, the elected controller device (i.e., action FIG. 240) could maintain a "hit points" value for the user that is decremented when the user fails to deflect one of the virtual lasers, and could further maintain a count of how many virtual lasers the user has deflected thus far. Additionally, the controller could retrieve state data for the user (e.g., by querying one of the cloud-based services 215 with an identifier for the user) and could use the user state data to adjust the playback of the story.

In addition to detecting nearby storytelling device within the same physical environment, the storytelling devices within a playgroup 230 may elect one of the storytelling devices as a controller storytelling device. A number of different techniques may be used for such an election. For example, a user could explicitly specify that a particular one of the storytelling devices (e.g., the user's favorite device) should be used as the controller. It may be preferable for the user to select a device that will remain with the user throughout the storytelling experience, so as to avoid a subsequent controller election part-way through the story. In one embodiment, the controller may be elected based on technical specifications and properties of the storytelling devices. For example, a storytelling device with a substantial amount of memory, processing power and communication bandwidth may be preferable as the controller, relative to a device having a lesser amount of computing resources.

As discussed above, the story may generally include stimulus events and corresponding actions, and may be linear in progression or dynamic (e.g., a story that includes different story arcs or branches). In one embodiment, the story may be defined such that each corresponding action is attribute to a type or role of storytelling device (i.e., as opposed to a specific storytelling device). In mapping the story to the available and compatible storytelling devices, the controller device 220 could determine a type of each of the storytelling devices, and could assign particular stimulus events and corresponding actions to each of the storytelling devices based on the determined type. For example, a particular story could state that an action should be performed by a storytelling device having the role of "Hero", and the controller could map the action onto a storytelling device within the playgroup having the role "Hero".

For instance, assuming that the storytelling device 240 represents a first fictional character action figure, the controller 240 could assign any stimulus events and actions within the story that are specific to the fictional character to the action FIG. 240. Likewise, if the story includes any stimulus events and actions designated for a hero-type character in the science fiction universe, the controller 240 could assign these stimulus events and the corresponding actions to the device 240 as well. In the event multiple storytelling devices are available that satisfy the criteria for a stimulus event/action combination (e.g., multiple hero devices are present and available within the playgroup), the controller 240 could select one of the storytelling devices to perform each of the stimulus event/action combinations. The controller could use a number of different techniques for mapping the actions to the compatible devices, including a random mapping algorithm, a load balancing algorithm (e.g., round robin), user preferences (e.g., assigning more actions to a device the user has identified as his favorite), explicit user instructions (e.g., allowing a user to customize the story, such as selecting which character will narrate the story), and so on. In one embodiment, the controller is configured to consider the audio output and processing capabilities of the various compatible devices, when selecting one of the devices to perform a given action to a particular stimulus event. For example, when assigning a dialogue action to one of the devices, the controller could select a device capable of outputting the dialogue action with the greatest sound quality, in lieu of another device capable of outputting the dialogue with a relatively poor sound quality. Advantageously, dynamically mapping the story onto the available and compatible devices allows the story to be used with various different storytelling devices and combinations of storytelling devices.

In one embodiment, the story may specify a distinct, contextually appropriate action to perform for various types of storytelling devices for a given stimulus event. That is, the controller could determine that a particular story includes a stimulus event designated for a hero character, and could specify a corresponding action designated for a action FIG. 240 and a separate, distinct action designated for an different hero character-based device. In such an embodiment, upon selecting one of the devices to respond to the stimulus event, the controller could assign the corresponding action to the device based on the device's type. Doing so helps to create a more immersive and realistic storytelling experience for the user, as the storytelling devices can be configured to react to stimulus events in a manner appropriate for the represented fictional character.

Once the controller maps the story onto the devices, the controller configures each of the storytelling devices with a number of stimulus events and corresponding effects relating to a first context of the story. As an example, the action FIG. 240 could detect when the user has successfully deflected a virtual laser fired from the storytelling device 245 (i.e., an occurrence of the stimulus event), and could audibly congratulate the user in response (i.e., performing the corresponding effect).

In some cases, the controller (e.g., controller device 240) can map a particular audio effect to multiple devices for playback. The playback on the multiple devices can be done in unison or by using a time delay across the various devices. For example, a slight time delay could improve the sound quality of a particular audio effect by avoiding phase cancellation of the audio output by the various devices. By doing so, the controller can achieve a stereoscopic or surround sound effect.

Figure 3:
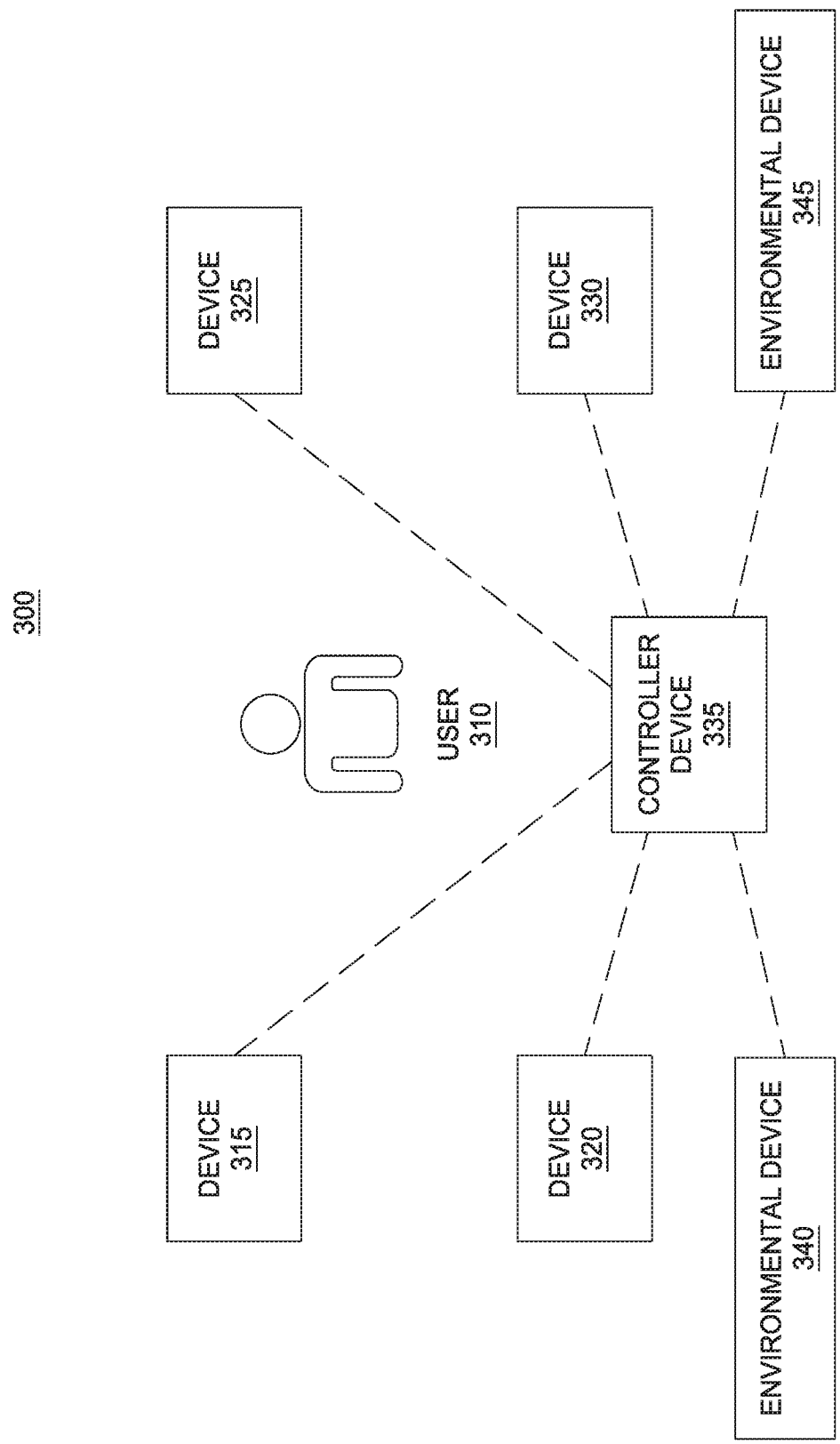
FIG. 3 illustrates a physical environment including storytelling devices and a user, according to one embodiment described herein.

FIG. 3 illustrates a physical environment including storytelling devices and a user, according to one embodiment described herein. As shown, the environment 300 includes a user 310 surrounded by a number of storytelling devices 315, 320, 325 and 335 as well as a control device 335. Generally, the control device 335 can select two or more of the devices 315, 320, 325 and 330 to output a particular sound and can generate a schedule by which the selected devices should output the sound. For instance, such a schedule could specify that the selected devices should output the sound in unison or could specify that each of the selected devices should output the sound effect at a different point in time, so as to introduce a time delay between the audio output of each device.

For example, a particular story having a jungle theme could include ambient sound effects that simulate the sounds of a jungle, including birds chirping, insects buzzing, the sound of a distant waterfall, and so on. In outputting the ambient sound effects, the control device 335 could distribute the various sound effects across the devices 315, 320, 325 and 330 (with some potentially output by the control device 335 itself) and could generate a timing schedule by which the various sound effects should be played by the devices 315, 320, 325 and 330. For example, the schedule could specify that the sound effects should be temporally staggered (i.e., not all played at the same time) and could distribute the sound effects across the devices 315, 320, 325 and 330, so as to create a three-dimensional soundscape for the user 310.

Additionally, as discussed above, the control device 335 can consider the individual audio playback and processing capabilities of the devices 315, 320, 325 and 330 when distributing the sound effects, so as to optimize the distribution of the sound effects to the most appropriate device 315, 320, 325 and 330. For example, a first sound effect could correspond to the beat of jungle drums and could include significant low frequency sounds, while a second sound effect could correspond to the sound of a distant waterfall and includes primarily medium frequency sounds. As such, the control device 335 could assign the sound effect of the drum beat to one of the devices 315, 320, 325 and 330 having audio output capabilities best suited to playing low frequency sounds, and could assign the waterfall sound effect to a device with more limited audio playback capabilities that is better capable of playing the primarily mid-range sound effect. Advantageously, doing so allows the control device 335 to optimize the assignments of the individual devices when creating the soundscape for the user 310.

In one embodiment, the control device 335 is configured to consider the position of the user 310 relative to the position of the devices 315, 320, 325 and 330, when distributing and scheduling sound effects to the various devices 315, 320, 325 and 330. For instance, assume that a particular story takes place within a bee hive and includes ambient sound effects simulating bees flying all around the user 310. The controller 335 could consider the user's 310 position in distributing the ambient sound effects to the devices 315, 320, 325 and 330 for playback, so as to ensure the output of the sound effects creates an immersive and three-dimensional soundscape for the user. Thus, in this example, the controller 335 could schedule the sound of a bee buzzing to be output by each of the devices 315, 320, 325 and 330 with a time delay in between each output, so that the sound of the bee appears to repeatedly encircle the user 310 who is positioned roughly in between all of the devices 315, 320, 325 and 330.

Moreover, the controller 335 can be configured to dynamically update the playback schedule and the devices used in the playback in real-time, as the position of the user 310 and the various devices changes. For instance, as the devices move throughout the physical environment (e.g., when carried by a user, when moving on their own, etc.), the controller 335 could dynamically update the playback schedule of the bee buzzing sound effect to maintain the effect of the sound encircling the user 310. For example, a first sequential playback order for the bee buzzing sound effect could be devices 315, device 320, control device 335, device 330 and then device 325, which could repeat indefinitely provided the devices 315, 320, 325, 330 and 325 and the user 310 remain in their depicted positions. However, if as part of the story playback the devices 315 and 330 move throughout the physical environment and change positions, the control device 335 could update the sequential playback order to be device 330, device 320, control device 335, device 315 and then device 325.

In addition to coordinating the devices 315, 320, 325, and 330, the control device 335 could control environmental devices 340 and 345 within the physical environment based on an environmental condition at a first playback position within an instance of audiovisual content. Generally, the environmental devices 340 and 345 represent items within the physical environment. Examples of such devices include lighting fixtures, window cover mechanisms (e.g., automated mechanisms for adjusting window shades for windows within the physical environment), temperature control devices and so on. The control device 335 could perform an operation to determine which environmental devices 340 and 345 are currently available within the physical environment (e.g., by carrying out a device discovery protocol over a data communications network).

Additionally, the control device 335 could analyze metadata for a first playback position of an instance of audiovisual content to determine an environmental condition associated with the first playback position. As an example, frames at a particular playback position within a movie could depict a bright, tropical location, and the control device 335 could analyze metadata corresponding to the movie to determine that the bright, topical location is depicted at the particular playback position. The control device 335 could then control one or more of the environmental devices 340 and 345 within the physical environment during playback of the first playback position within the first instance of audiovisual content, based on the determined environmental condition.

For example, assume that the environmental device 340 is a window cover mechanism. Upon determining that a bright, tropical location is being depicted, and upon further determining that the sun is currently out in the geographic area in which the physical environment is located (e.g., by querying a remote weather server using a data communications network), the control device 335 could transmit an instruction to the environmental device 340 in order to raise the covers on the windows, thereby letting more sunlight into the physical environment. Doing so allows the physical environment to dynamically adjust to the current position in the audiovisual content.

As another example, assume that the environmental device 345 is a temperature control device (e.g., a WiFi-enabled thermostat, and standalone heating and/or cooling device, etc.). Upon determining that the bright, topical location is being depicted, the control device 335 could transmit an instruction to the environmental device 345 in order to increase the temperature within the physical environment. Doing so allows the temperature of the physical environment to dynamically adjust to the current position in the audiovisual content. Additionally, in such an embodiment, the control device 335 could be configured to adjust the temperature of the physical environment based on an environmental condition at a future payback position within the audiovisual content. That is, as the environment's heating and cooling system may take several minutes in order to adjust the temperature within the physical environment, the control device 335 could begin adjusting the temperature in advance of the playback position depicting the bright, tropical location, so that the temperature is increased when the playback position is reached.

One embodiment includes an environmental device configured to provide a user experience of temperature changes within the physical environment, without altering the temperature throughout the entire physical environment. As an example, an environmental device could emit warmer or cooler air (i.e., relative to the ambient temperature of the physical environment) and could blow this air (e.g., using a fan or other suitable mechanism) in the direction of a user. Such an embodiment may be preferable over attempting to control the ambient temperature of the physical environment, as such a device can adapt more quickly to temperature variations. For instance, an instance of video content could include frames depicting a fire super power being used and additional frames, a short time later, depicting an ice super power being used. In such an example, a thermostat environmental device configured to control the ambient temperature of the physical environment may be unsuitable for such a situation, as such a device may not be able to alter the temperature of the ambient environment quickly enough.

The control device 335 can be configured to recognize a number of different relationships between the position within the audiovisual content and the environmental conditions. As discussed above, environmental devices (e.g., illumination devices, television devices, etc.) can be instructed to display particular colors in response to a user-performed gesture, while other environmental devices can be configured to control the temperature of the physical environment in response to a depicted location within frames of video data. Additionally, the control device 335 could be configured to control the behavior of the environmental devices based on a depicted time of day within the audiovisual content. For example, upon determining that a current position within the audiovisual content depicts a location during the day time and upon determining that the audiovisual content is being played during the day, the control device 335 could be configured to raise the window blinds in the physical environment to let more sunlight into the physical environment. As another example, upon determining that a current position within the audiovisual content depicts a night time location, the control device 335 could be configured to lower the window blinds and/or dim the lights within the physical environment to match the lighting conditions of the current position of the audiovisual content. Advantageously, doing so enables the physical environment to better mirror the environment depicted within the currently playing audiovisual content.

Generally, the control device 335 can be configured to control the environmental devices for a number of different types of audiovisual content. For example, the control device 335 could adjust the environmental devices within the physical environment based on an environmental condition within an augmented reality play experience. For instance, the control device 335 could detect that a user has performed a predefined gesture within the physical environment. As an example, a particular hand gesture could be associated with casting a frost bolt spell within a particular augmented reality game. Upon detecting that the user has performed the particular hand gesture, the control device 335 could adjust the temperature within the physical environment by transmitting an instruction to the environmental device 345 (e.g., a WiFi-equipped thermostat) specifying to lower the temperature. As another example, responsive to detecting the user has performed the predefined gesture, the control device 335 could transmit an instruction to one or more environmental illumination devices within the physical environment, specifying to adjust the lighting within the physical environment to include more blue coloration. As another example, the control device 335 could instruct the environmental illumination device to dim or brighten the lighting within the environment, responsive to a user performed gesture (or based on metadata describing a playback position within a video game, movie or other audiovisual content). Doing so increases the realism of the augmented reality play experience.

Generally, embodiments can be deployed in a variety of different physical environments. For example, one embodiment is configured to be implemented within a user's home (or other residence). In such an embodiment, the environmental devices could include devices such as WiFi-equipped thermostat, automated window coverings (e.g., automated blinds), illumination devices (e.g., lighting devices configured with data communication links), display devices (e.g., WiFi-equipped television devices), audio devices (e.g., sound receivers) and so on. As another example, another embodiment is implemented within a vehicle. In such an embodiment, the environmental devices could include the vehicle's temperature control, window coverings, lighting devices within the vehicle, and so on. More generally, any physical environment suitable for carrying out the functionality described herein can be used, consistent with the functionality described herein.

Figure 4:
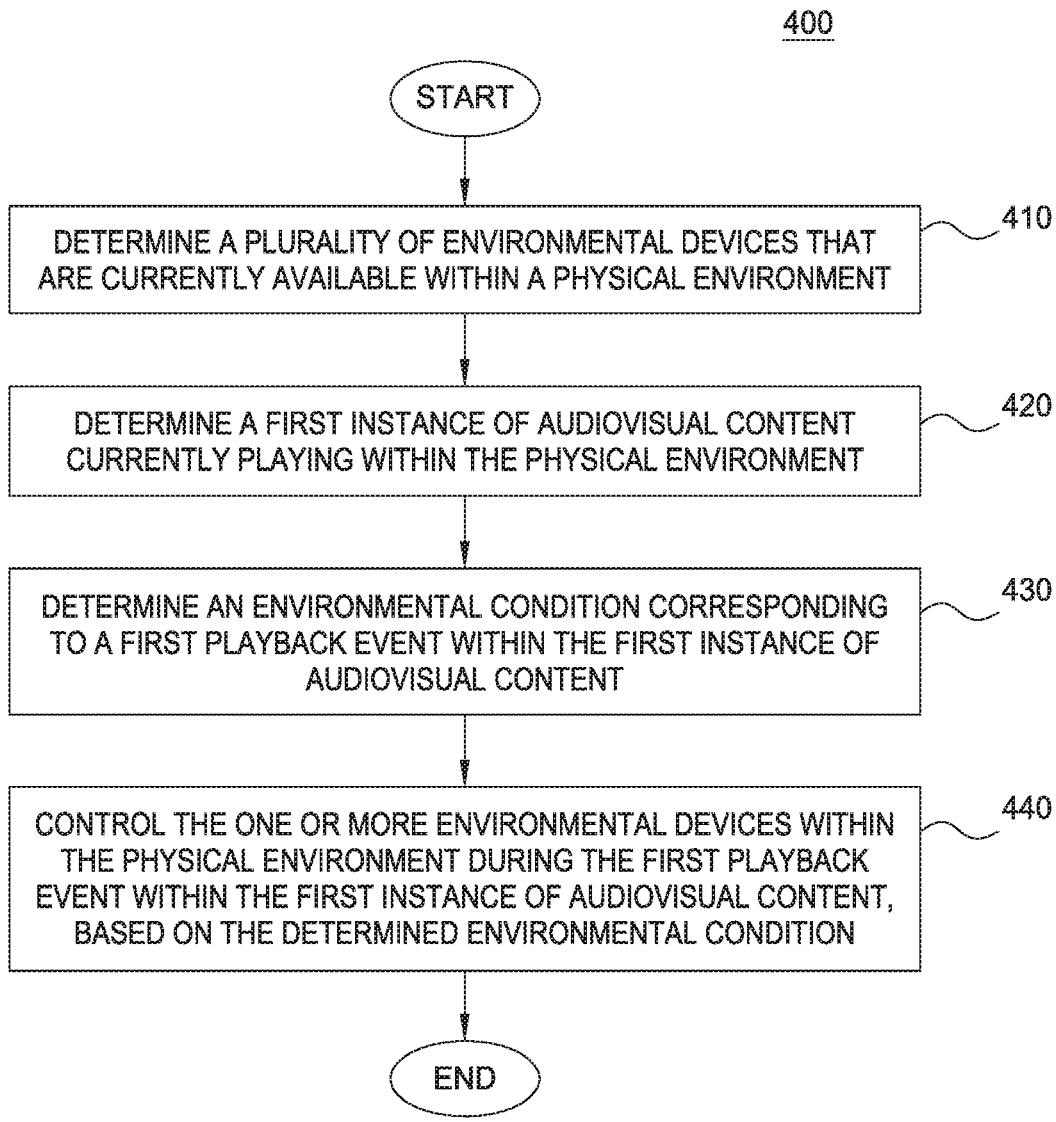
FIG. 4 is a flow diagram illustrating a method for controlling environmental devices based on playback of audio-visual content, according to one embodiment described herein.

FIG. 4 is a flow diagram illustrating a method for controlling environmental devices based on playback of audiovisual content, according to one embodiment described herein. As shown, the method 400 begins at block 410, where a control device 335 determines a plurality of environmental devices that are currently available within a physical environment. As discussed above, such environmental devices can include window coverings, thermostats, lighting devices and so on. Generally, the control device 335 can determine a particular environmental device is available when the device is operating in a normal fashion (e.g., powered and not experiencing an error) and when the device is able to communicate with the control device 335 (e.g., using a data communications link). For example, the control device 335 could transmit a message to the environmental device (e.g., over a WiFi communications link) and, upon receiving an acknowledgement message back from the environmental device (e.g., over the WiFi communications link), the control device 335 could determine the environmental device is available.

Additionally, the control device 335 determines a first instance of audiovisual content currently playing within the physical environment (block 420). Examples of audiovisual content include, without limitation, video game content, movie content, and augmented reality game content. For example, the control device 335 could receive a network message from a display device (e.g., a television set, a mobile device, etc.), specifying that a particular instance of video content is currently being output on the display device. In one embodiment, such a message specifies a content identifier that uniquely identifies (e.g., within a particular content library) the instance of video content. As another example, the control device 335 could determine a current story that the control device 335 is controlling playback of for a particular playgroup.

The control device 335 also determines an environmental condition corresponding to a first playback event within the first instance of audiovisual content (block 430). For example, the first playback event could be the playback of a particular position within the first instance of audiovisual content (e.g., playback of an instance of video content reaching a particular position within the video content). As another example, the first playback event could be the detection of a particular gesture being performed by the user within the physical environment. As yet another example, the first playback event could be the detection of a particular sound (e.g., a noise, a spoken phrase, etc.) being made by the user within the physical environment. The control device 335 then controls the one or more environmental devices within the physical environment during the first playback event within the first instance of audiovisual content, based on the determined environmental condition (block 440) and the method 400 ends.

For example, the control device 335 could determine that the user has performed a particular physical gesture that corresponds to a particular spell within the augmented reality game. In response, the control device 335 could determine one or more environmental conditions corresponding to the particular spell. In one embodiment, the control device 335 is configured to determine the one or more environmental conditions based in part on which environmental device(s) are currently available within the physical environment. For instance, the control device 335 could determine that the particular spell is a frost bolt spell within the augmented reality game and could further determine that such a spell is associated with the environmental conditions of blue lighting effects and reduced temperatures. In this example, the control device 335 could further determine that no temperature control environmental devices are currently available within the physical environment, but could determine that a lighting device is currently available. The control device 335 could then transmit a control instruction to the lighting device responsive to the user performed gesture, instructing the lighting device to increase the amount of blue coloration in the light output of the lighting device.

Figure 5:
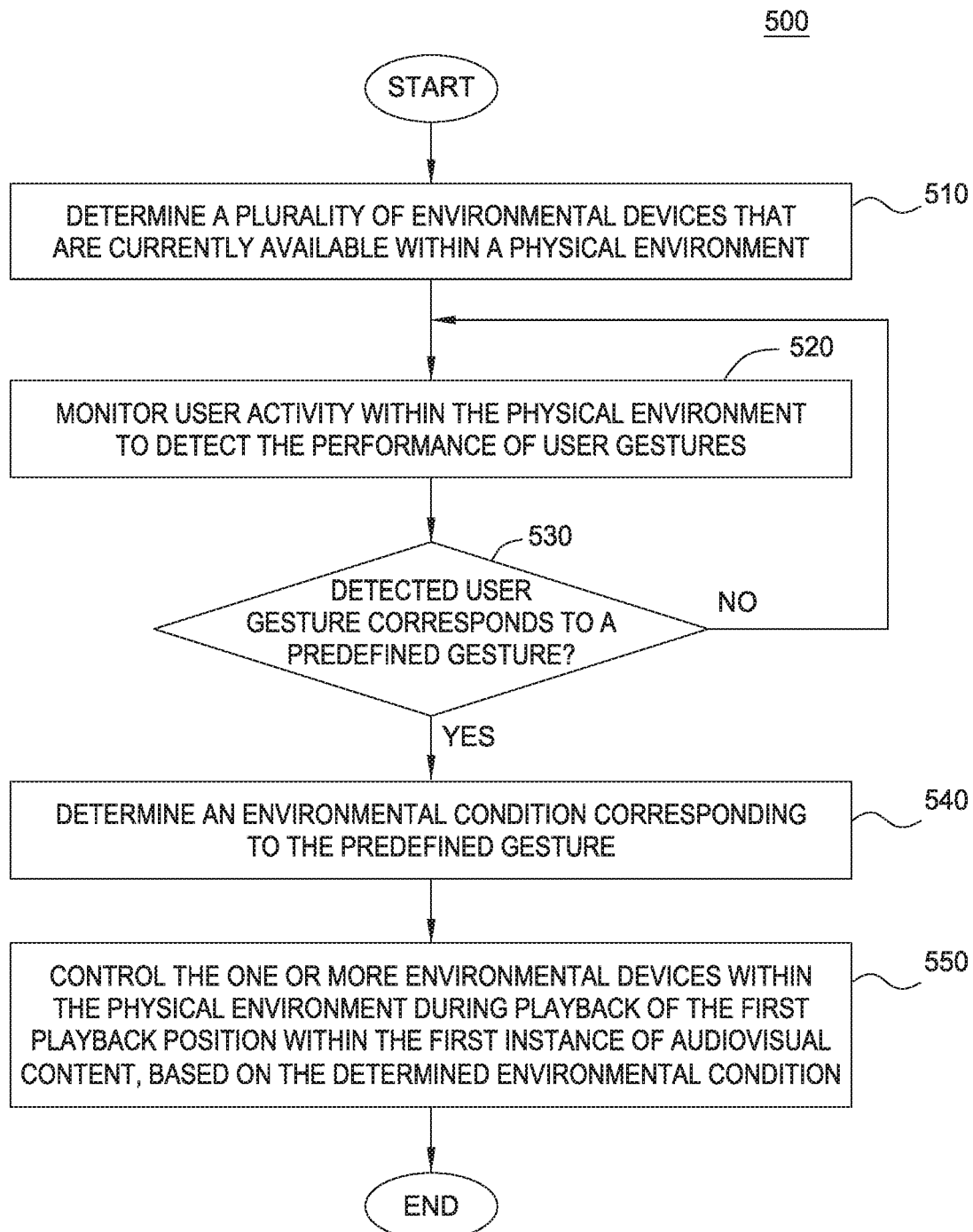
FIG. 5 is a flow diagram illustrating a method for controlling environmental devices based on playback of audio-visual content, according to one embodiment described herein.

FIG. 5 is a flow diagram illustrating a method for controlling environmental devices based on playback of audiovisual content, according to one embodiment described herein. As shown, the method 500 begins at block 510, where the control device 335 determines a plurality of environmental devices that are currently available within a physical environment. Additionally, the control device 335 monitors user activity within the physical environment to detect the performance of user gestures (block 520). For example, the control device 335 could monitor user behavior within the physical environment using one or more camera devices and could analyze images captured by the one or more camera devices to determine when the user has performed one of a plurality of distinct predefined gesture. As another example, the user could wear a device (e.g., a wristband) configured with sensor devices (e.g., an accelerometer, an electromyography (EMG) sensor, etc.), and the control device 335 could use data collected from the sensor devices to determine when the user performs a particular gesture. For instance, the control device 335 could analyze EMG sensor data collected from the user-worn device to determine when the user's muscle movements match muscle movements associated with the predefined gesture, indicating that the user has performed the predefined gesture.

If the control device 335 determines that the user has performed the predefined gesture (block 530) the control device 335 determines an environmental condition corresponding to the predefined gesture (block 540). As an example, the control device 335 could determine that the performed user gesture corresponds to an illumination spell within the augmented reality game, and could determine that the illumination spell has a predefined relationship (e.g., specified within a database) environmental condition of brighter light within the physical environment. The control device 335 could then select one or more of the environmental devices capable of affecting the environmental condition (e.g., based on predefined attributes of the environmental devices specified in one or more data structures). For instance, the control device 335 could determine that a particular environmental device within the physical environment is a lighting device and could select such a device responsive to the user performed gesture. The control device 335 then controls the one or more environmental devices within the physical environment during playback of the first playback event within the first instance of audiovisual content, based on the determined environmental condition (block 550) and the method 500 ends.

For example, a particular illumination device could be a light source within the physical environment, and the control device 335 could transmit an instruction to the light source (or to a controller for the light source), instructing the light source to increase an amount of light it is currently outputting within the physical environment. In some instances, an environmental device may be capable of performing a particular effect only in certain conditions. For instance, a window covering device may be capable of affecting the environmental condition of increased illumination during certain hours of the day. As an example, the control device 335 could determine a current time for the physical environment and could further determine a range of hours during which the sun is out for the geographic region in which the physical environment is located (e.g., based on predefined parameters, based on data obtained by querying a remote weather serer, etc.). If the current time is within the range of hours during which the sun is known to be out, the control device 335 could be configured to also instruct the window covering device to raise the window covering, thereby letting more sunlight into the physical environment, as part of achieving the increased illumination environmental condition.

Figure 6:
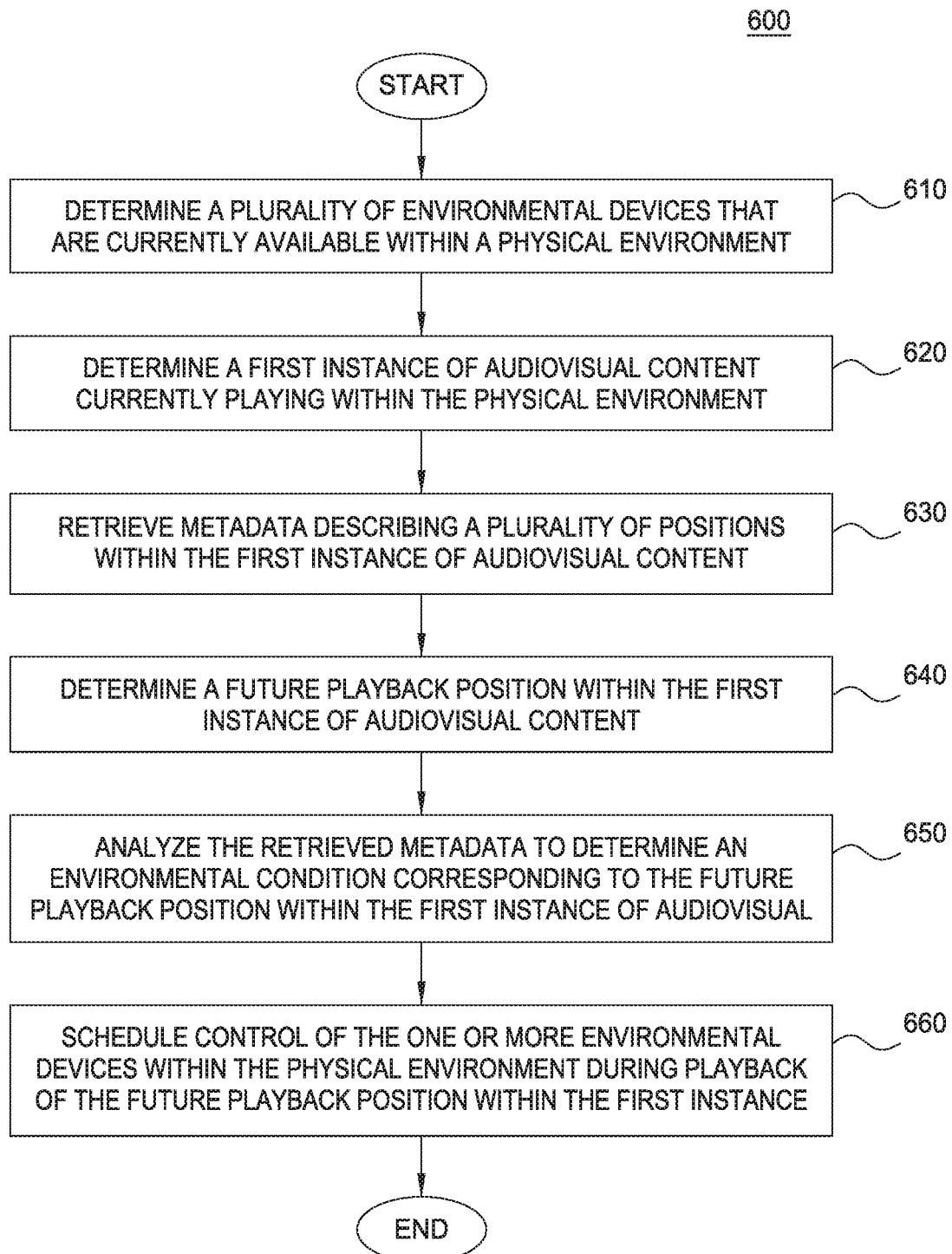
FIG. 6 is a flow diagram illustrating a method for controlling environmental devices based on playback of audio-visual content, according to one embodiment described herein.

FIG. 6 is a flow diagram illustrating a method for controlling environmental devices based on playback of audiovisual content, according to one embodiment described herein. As shown, the method 600 begins at block 610, where the control device 335 determines a plurality of environmental devices that are currently available within a physical environment. Additionally, the controller device 33 determines a first instance of audiovisual content currently playing within the physical environment (block 620). For example, the control device 335 could transmit a request to a display device (e.g., a WiFi-enabled television device) within the physical environment to determine an instance of video content (e.g., a streaming movie, a broadcast television program, etc.) that is currently playing on the display device. Continuing the example, the control device 335 could receive a response from the display device, specifying a content identifier that uniquely identifiers the instance of video content currently playing on the display device.

Upon determining the instance of video content that is currently playing on the display device, control device 335 could retrieve metadata describing a plurality of positions within the first instance of audiovisual content (block 630). For example, the metadata could describe locations depicted at various points within the audiovisual content, times of day (e.g., daytime, nighttime, dusk, etc.) depicted at various points within the audiovisual content, actions depicted at various points within the audiovisual content (e.g., a spell cast by a character depicted within frames of the audiovisual content, a super power used by a character depicted within frames of the audiovisual content, etc.) and so on. The control device 335 could then determine a future playback position within the first instance of audiovisual content (block 640) and could analyze the retrieved metadata to determine an environmental condition corresponding to the future playback position within the first instance of audiovisual content (block 650). For instance, the control device 335 could determine that the metadata indicates that a particular super power is depicted as used within frames of the audiovisual content at the future playback position and could determine that a particular environmental condition has a predefined association with the particular super power. For instance, a superpower involving fire could be associated with red light being emitted in the physical environment and further associated with an increase in the temperature of the physical environment.

The control device 335 then schedules control of the one or more environmental devices within the physical environment during playback of the future playback position within the first instance of audiovisual content, based on the determined environmental condition (block 660), and the method 600 ends. For instance, continuing the above example, the control device 335 could schedule for an illumination environmental device to illuminate red light within the physical environment during the future playback position. The control device 335 could then transmit an instruction to the illumination environmental device in accordance with the schedule, instructing the illumination environmental device to display red light during the future playback position. The control device 335 could also schedule for a temperature control device within the physical environment to increase the temperature of the physical environment during the future playback position. As an example, the control device 335 could transmit an instruction to a temperature control device, instructing the device to increase the temperature within the physical environment.

Technical Description

Figure 7:
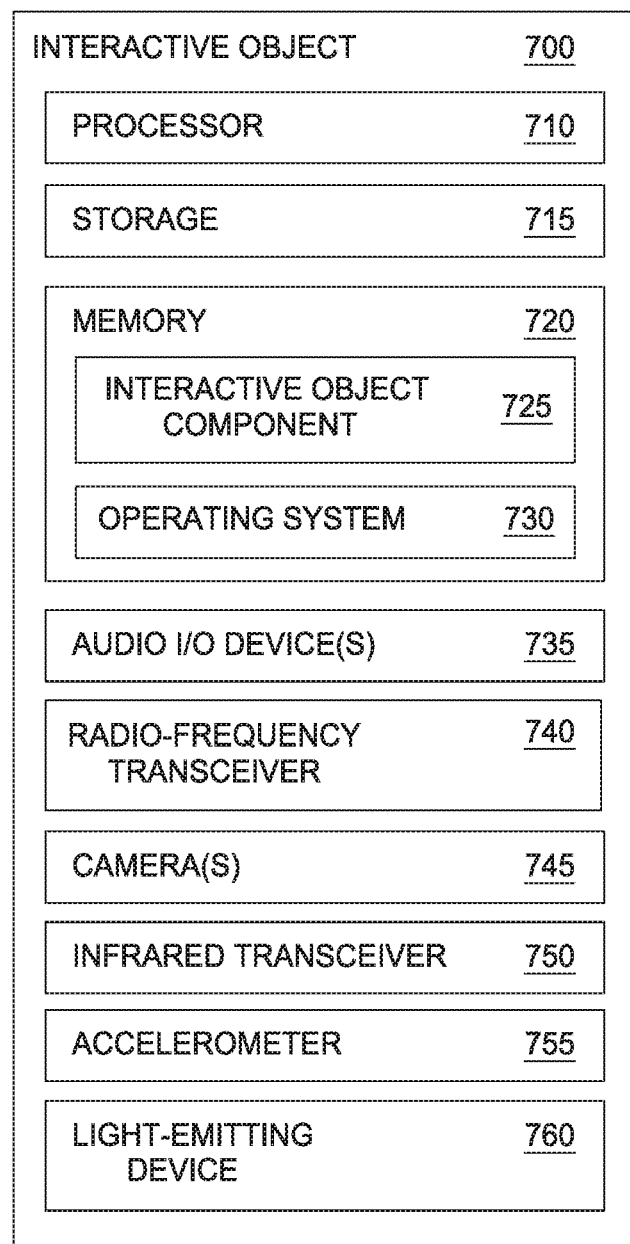
FIG. 7 is a block diagram illustrating an interactive object, according to one embodiment described herein.

An example of an interactive device is shown in FIG. 7, which is a block diagram illustrating an interactive device configured with an interactive object component, according to one embodiment described herein. In this example, the device 700 includes, without limitation, a processor 710, storage 715, memory 720, audio input/output (I/O) device(s) 735, a radio-frequency (RF) transceiver 740, a camera device(s) 745, an infrared transceiver 750, an accelerometer device 755, and a light-emitting device 760. Generally, the processor 710 retrieves and executes programming instructions stored in the memory 720. Processor 710 is included to be representative of a single CPU, multiple CPUs, a single CPU having multiple processing cores, GPUs having multiple execution paths, and the like. The memory 720 is generally included to be representative of a random access memory. The radio-frequency transceiver 740 enables the interactive object component 725 to connect to a data communications network (e.g., wired Ethernet connection or an 802.11 wireless network). As discussed above, the interactive device may include one or more battery devices (not shown).

Further, while the depicted embodiment illustrates the components of a particular interactive device, one of ordinary skill in the art will recognize that interactive devices may use a variety of different hardware architectures. For instance, in one embodiment the controller component logic is implemented as hardware logic. Examples of such hardware logic include, without limitation, an application-specific integrated circuit (ASIC) and a field-programmable gate array (FPGA). Moreover, it is explicitly contemplated that embodiments may be implemented using any device or computer system capable of performing the functions described herein.

Returning to the embodiment depicted in FIG. 7, the memory 720 represents any memory sufficiently large to hold the necessary programs and data structures. Memory 720 could be one or a combination of memory devices, including Random Access Memory, nonvolatile or backup memory (e.g., programmable or Flash memories, read-only memories, etc.). In addition, memory 720 and storage 715 may be considered to include memory physically located elsewhere; for example, on another computer communicatively coupled to the interactive device 700. Illustratively, the memory 720 includes an interactive object component 725 and an operating system 730. The interactive object component 725 could be configured to receive commands (e.g., encoded in RF or infrared signals) and to execute the commands to perform audiovisual effects. In one embodiment, the interactive object component 725 is configured to decrypt the commands using a received key before executing the commands. The operating system 730 generally controls the execution of application programs on the interactive device 700. Examples of operating system 730 include UNIX, a version of the Microsoft Windows® operating system, and distributions of the Linux® operating system. Additional examples of operating system 730 include custom operating systems for gaming consoles, including the custom operating systems for systems such as the Nintendo DS® and Sony PSP®.

The infrared transceiver 750 represents any device capable of sending and receiving infrared signals. In another embodiment, a device 700 that only sends or receives infrared signals may be configured with an infrared transmitter or a infrared receiver, respectively, as opposed to the infrared transceiver 750. The sound I/O devices 735 could include devices such as microphones and speakers. For example, the speakers could be used to produce sound effects (e.g., explosion sound effects, dialogue, etc.) and/or to produce vibration effects.

Generally, the interactive object component 725 provides logic for the interactive device 700. For example, the interactive object component 725 could be configured to detect that a coded infrared signal has been received (e.g., using the infrared transceiver 750). The interactive object component 725 could then determine a type of the infrared signal (e.g., based on data specified within the coded infrared signal) and could determine a corresponding response based on determined type. For example, the interactive object component 725 could determine that the infrared signal specifies that a repulsor ray blast sound effect should be played, and, in response, could output the specified sound effect using audio I/O devices 735. As another example, the signal could be encoded with data specifying that a particular lighting effect should be displayed according to a specified schedule (e.g., at a particular point in time), and the interactive object component 725 could monitor the schedule (e.g., using an internal clock) and could activate the appropriate light-emitting device 760 at the appropriate time.

Figure 8:
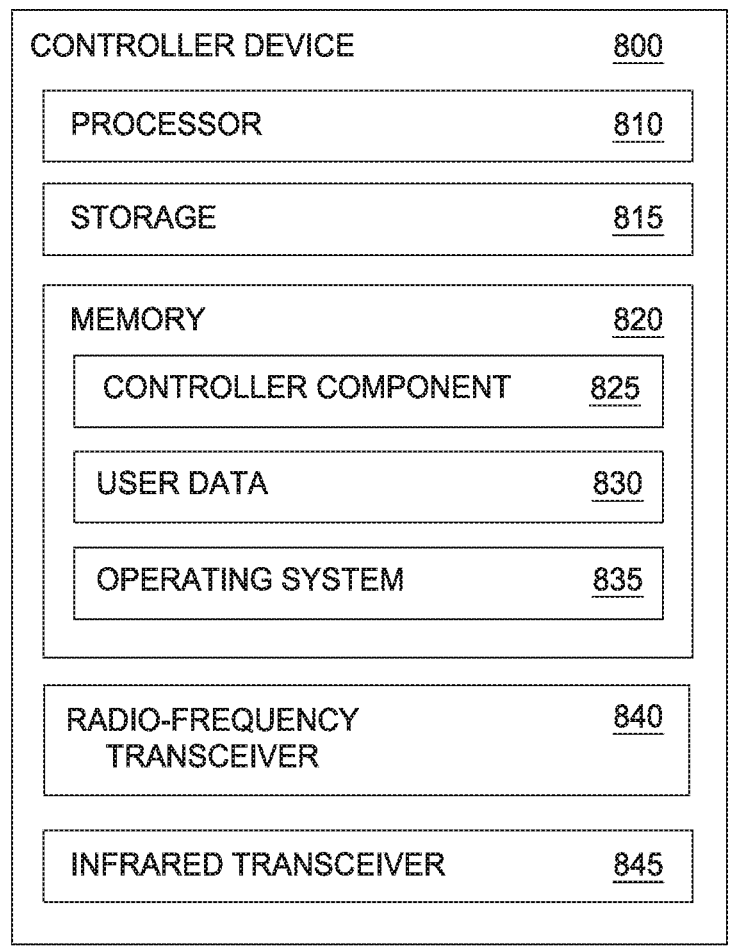
FIG. 8 is a block diagram illustrating a controller device, according to one embodiment described herein.

FIG. 8 illustrates an example of a controller device, according to one embodiment described herein. As shown, the controller 800 includes a processor 810, storage 815, memory 820, a radio-frequency transceiver 840 and an infrared transceiver 845. Generally, the processor 810 retrieves and executes programming instructions stored in the memory 820. Processor 810 is included to be representative of a single CPU, multiple CPUs, a single CPU having multiple processing cores, GPUs having multiple execution paths, and the like. The memory 820 is generally included to be representative of a random access memory. The radio-frequency transceiver 840 enables the controller device 800 to transmit and receive radio-frequency signals. Likewise, the infrared transceiver 845 allows the device 800 to transmit and receive infrared signals. Further, while the depicted embodiment illustrates the components of a particular controller device 800, one of ordinary skill in the art will recognize that interactive objects may use a variety of different hardware architectures. Moreover, it is explicitly contemplated that embodiments may be implemented using any device or computer system capable of performing the functions described herein.

The memory 820 represents any memory sufficiently large to hold the necessary programs and data structures. Memory 820 could be one or a combination of memory devices, including Random Access Memory, nonvolatile or backup memory (e.g., programmable or Flash memories, read-only memories, etc.). In addition, memory 820 and storage 815 may be considered to include memory physically located elsewhere; for example, on another computer communicatively coupled to the controller device 800. Illustratively, the memory 820 includes a controller component 825, user data 830 and an operating system 835. The operating system 835 generally controls the execution of application programs on the controller device 800. Examples of operating system 835 include UNIX, a version of the Microsoft Windows® operating system, and distributions of the Linux® operating system. Additional examples of operating system 835 include custom operating systems for gaming consoles, including the custom operating systems for systems such as the Nintendo DS® and Sony PSP®.

Generally, the controller component 825 configures the interactive objects (e.g., toys 110, 115 and 120, or an action disc device 200) to perform particular actions. The particular actions can also be based on the user data 830 (e.g., historical interactions data between the user and various interactive objects, user preferences data, etc.) and one or more environmental factor (e.g., a room of the house the object is currently in, a time of day, a day of the week, etc.). For instance, in one embodiment, the controller component 825 is configured with logic for recognizing particular events and broadcasting commands for the devices to perform a corresponding action(s) in response. In such an embodiment, the controller component 825 could use input/output devices (e.g., cameras, microphones, wireless transceivers, infrared sensors, etc.) to detect when a particular event occurs. For instance, the controller component 825 could use a camera to detect when a particular projection appears, and could then broadcast a command (e.g., using a RF signal) instructing the devices to perform a corresponding action in response. As another example, the controller component 825 could receive a wireless signal (e.g., an RF signal, data communicated using Bluetooth communications, etc.) from another one of the devices, indicating that a particular action has been performed. The device could then broadcast a signal instructing one or more other devices to perform a corresponding action responsive to receiving the signal.

In a particular embodiment, the controller component 825 is configured to control the actions of multiple devices to cause the devices to perform audiovisual effects synchronously. For instance, the controller component 825 could broadcast a message to the devices, instructing the devices to perform a particular audiovisual effect immediately upon receiving the message. As another example, the controller component 825 could broadcast a message to the devices, instructing the devices to perform actions (e.g., play a sound effect, trigger a lighting effect, etc.) according to a schedule. Here, the devices may maintain internal clocks that are synchronized with one another for use in synchronously performing the audiovisual actions.

As discussed above, the controller component 825 can be configured to dynamically optimize the playback of audio on various interactive devices used in the playback of the story. Such alterations can include, without limitation, variable bit rate encodings of audio files, generating audio data using MIDI control operations, applying equalization parameters to alter audio data, scheduling multiple devices to output sound effects according to a schedule to give the impression of stereophonic or surround-sound, and so on. Doing so helps to provide a more immersive soundscape during the playback of a story.

Generally speaking, the devices and the controller 800 may be implemented in any number of different ways, consistent with the present disclosure. With respect to hardware, embodiments may employ a modular design for maximum hardware reusability across different interactive objects. Such a design could include, for instance, hardware adapters that allow common processors, memories and buses to receive and send data via a multiplicity of sensors, displays, effectors and other means of communication. Additionally, system and/or operating system agnostic sites (e.g., Portals) could be used to ensure maximum compatibility for all users.

Figure 9:
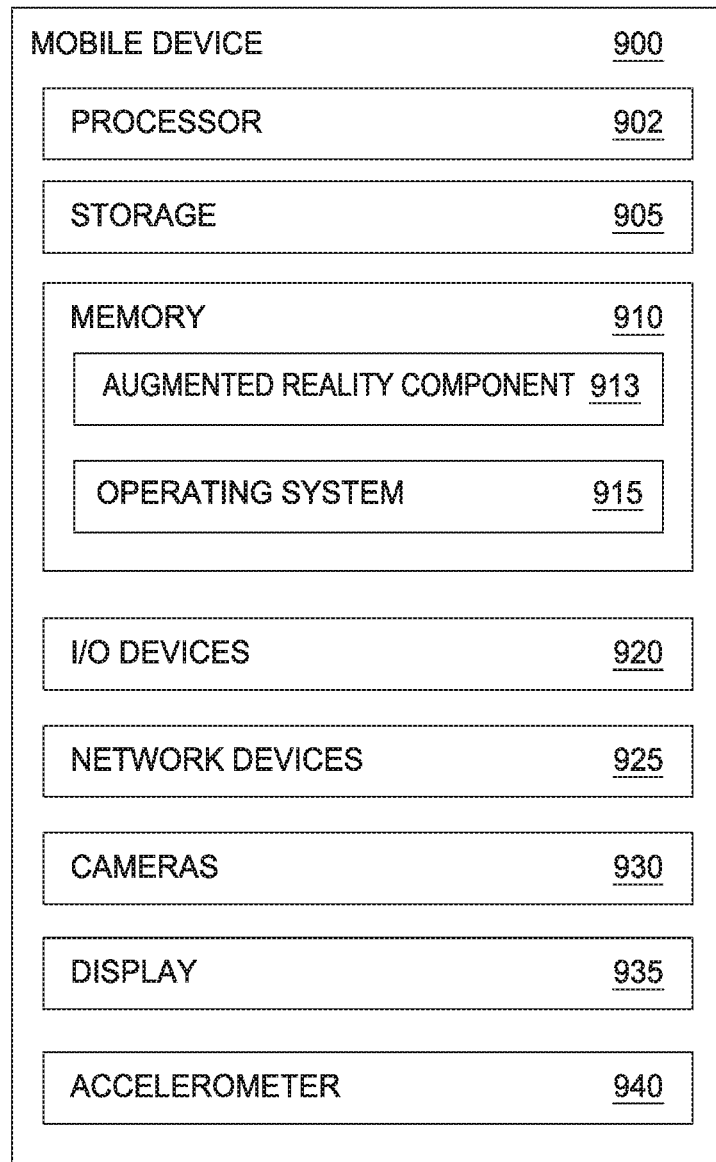
FIG. 9 is a block diagram illustrating a mobile device configured with an augmented reality component, according to one embodiment described herein.

FIG. 9 is a block diagram illustrating a mobile device configured with an augmented reality component, according to one embodiment described herein. In this example, the mobile device 900 includes, without limitation, a processor 902, storage 905, memory 910, I/O devices 920, a network interface 925, camera devices 930, a display devices 935 and an accelerometer device 940. Generally, the processor 902 retrieves and executes programming instructions stored in the memory 910. Processor 902 is included to be representative of a single CPU, multiple CPUs, a single CPU having multiple processing cores, GPUs having multiple execution paths, and the like. The memory 910 is generally included to be representative of a random access memory. The network interface 925 enables the mobile device 900 to connect to a data communications network (e.g., wired Ethernet connection or an 802.11 wireless network). Further, while the depicted embodiment illustrates the components of a particular mobile device 900, one of ordinary skill in the art will recognize that augmented reality devices may use a variety of different hardware architectures. Moreover, it is explicitly contemplated that embodiments of the invention may be implemented using any device or computer system capable of performing the functions described herein.

The memory 910 represents any memory sufficiently large to hold the necessary programs and data structures. Memory 910 could be one or a combination of memory devices, including Random Access Memory, nonvolatile or backup memory (e.g., programmable or Flash memories, read-only memories, etc.). In addition, memory 910 and storage 905 may be considered to include memory physically located elsewhere; for example, on another computer communicatively coupled to the mobile device 900. Illustratively, the memory 910 includes an augmented reality component 913 and an operating system 915. The operating system 915 generally controls the execution of application programs on the augmented reality device 900. Examples of operating system 915 include UNIX, a version of the Microsoft Windows® operating system, and distributions of the Linux® operating system. Additional examples of operating system 915 include custom operating systems for gaming consoles, including the custom operating systems for systems such as the Nintendo DS® and Sony PSP®.

The I/O devices 920 represent a wide variety of input and output devices, including displays, keyboards, touch screens, and so on. For instance, the I/O devices 920 may include a display device used to provide a user interface. As an example, the display may provide a touch sensitive surface allowing the user to select different applications and options within an application (e.g., to select an instance of digital media content to view). Additionally, the I/O devices 920 may include a set of buttons, switches or other physical device mechanisms for controlling the augmented reality device 900. For example, the I/O devices 920 could include a set of directional buttons used to control aspects of a video game played using the augmented reality device 900.

Figure 10:
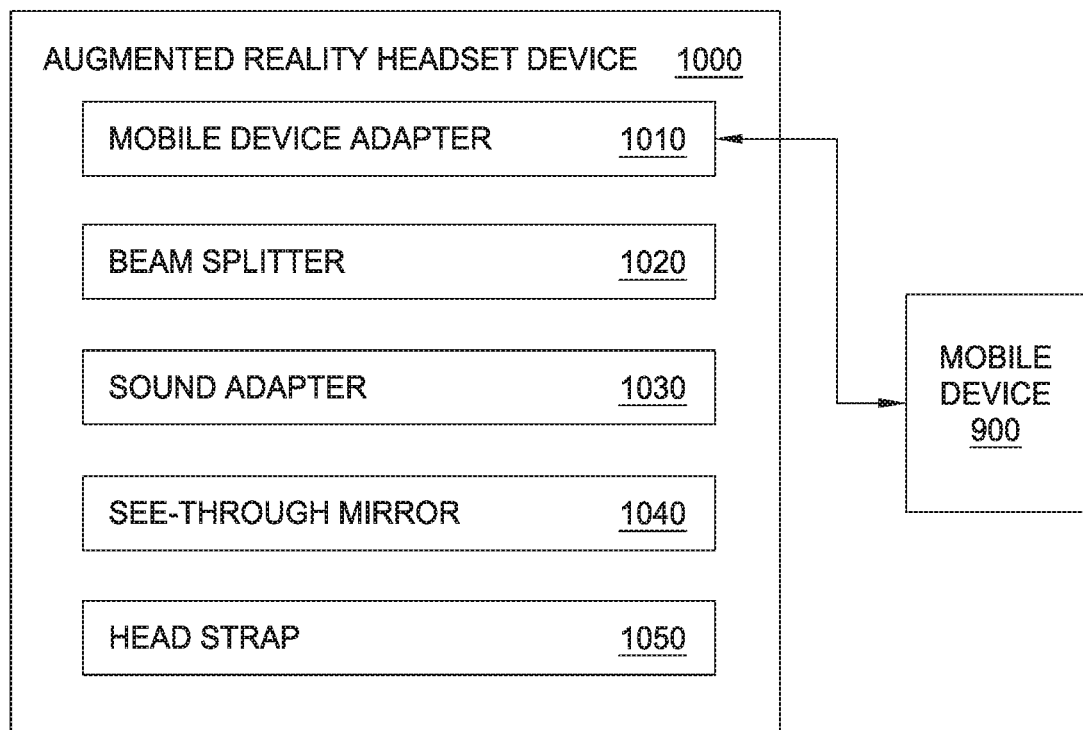
FIG. 10 is a block diagram illustrating an augmented reality headset, according to one embodiment described herein.

FIG. 10 is a block diagram illustrating an augmented reality headset, according to one embodiment described herein. The augmented reality headset 1000 includes a mobile device adapter 1010, a beam splitter 1020, a sound adapter 1030, a see-through mirror 1040 and a headstrap 1050. Generally, the augmented reality headset device 1000 is configured to interface with a mobile device 900, by way of the mobile device adapter 1010. For example, the mobile device adapter 1010 could be a slot within the augmented reality headset 1000 configured to hold the mobile device 900. The beam splitter 1020 and see-through mirror 1040 are generally arranged in such a way as to project light from the display device 935 of the mobile device 900 to the user's eyes, when the user views the physical environment while wearing the augmented reality headset 1000. For example, the beam splitter 1020 and see-through mirror 1040 could be arranged in the configuration shown in FIG. 3B and discussed above. More generally, however, any configuration suitable for providing an augmented reality display using the light from the display device 935 of the mobile device 900 can be used, consistent with the functionality described herein. The headstrap 1050 generally is used to secure the augmented reality headset 900 to the user's head. More generally, however, any mechanism (e.g., temples that rest atop the user's ears) for securing the augmented reality headset 900 can be used.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system of integrating environmental devices into a play experience to synchronize changes in physical and virtual environments, the system comprising:
   one or more computer processors; and
   a memory containing computer program code that, when executed by operation of the one or more computer processors, performs an operation comprising:
      determining that an initial playback event is occurring within an interactive came;
      determining an environmental change in the interactive game that will occur during a specified playback event within the interactive game, prior to the specified playback event occurring within the interactive game, wherein the environmental chance is to be depicted in one or more frames displayed during the specified playback event;
      determining an amount of time before the specified playback event is to occur, wherein the amount of time is sufficient to permit a first one or more environmental devices to at least substantially effect a desired change in the physical environment before the specified playback event occurs; and
      during the initial playback event within the interactive game, at least substantially effecting the desired change in the physical environment synchronously with the environmental change in the interactive game, by controlling the first one or more environmental devices based on the amount of time.

2. The system of claim 1, wherein the desired change includes at least three changes, wherein the at least three changes are of three distinct types selected from temperature, illumination, and sound, wherein the operation further comprises:
- controlling a second one or more environmental devices within the physical environment, wherein the second one or more environmental devices comprise one or more illumination devices within the physical environment;
- wherein controlling the second one or more environmental devices comprises:
  - adjusting an illumination level of at least one of the one or more illumination devices based on an illumination level depicted at the initial playback event within the interactive game;
  - activating or deactivating at least one of the one or more illumination devices based on the illumination level depicted at the initial playback event within the interactive game; and
  - adjusting a coloration of at least one of the one or more illumination devices based on a coloration depicted at the initial playback event within the interactive game.

3. The system of claim 2, wherein the first one or more environmental devices comprise one or more temperature control devices within the physical environment, wherein controlling the first one or more environmental devices comprises adjusting a temperature level of the one or more temperature control devices, wherein the desired change comprises the physical environment reaching a predefined temperature, wherein the predefined temperature comprises an ambient temperature;
- wherein the operation further comprises determining the first one or more environmental devices as being available within the physical environment, which in turn comprises using infrared light to detect the first one or more environmental devices as being available, wherein controlling the first one or more environmental devices comprises using radio frequency signals to communicate with the first one or more environmental devices.

4. The system of claim 3, wherein the second one or more environmental devices comprise one or more audio devices within the physical environment, wherein controlling the second one or more environmental devices comprises transmitting an audio effect for playback using the one or more audio devices, wherein the audio is scheduled to be played at a first moment in time by a first audio device and at a second moment in time by a second audio device;
- wherein the audio is scheduled to be played at the first and second moments in time by the first and second audio devices based on a location of a user in the physical environment.

5. The system of claim 4, wherein the desired change includes changes of three distinct types selected from temperature, illumination, and sound, wherein the operation further comprises:
- controlling a third one or more environmental devices within the physical environment, wherein the third one or more environmental devices comprise one or more window cover devices for one or more windows within the physical environment;
- wherein controlling the third one or more environmental devices comprises:
  - upon determining that it is sunny outside of the physical environment, activating the window cover devices to further uncover the one or more windows within the physical environment;
- wherein the interactive game comprises (i) a video content, (ii) video game content, and (iii) augmented reality game content.

6. The system of claim 5, wherein the physical environment comprises an interior of a vehicle, wherein the third one or more environmental devices include at least one automated window covering, wherein each of the first, second, and third one or more environmental devices within the physical environment are controlled in a synchronized fashion with one or more augmented reality effects that are depicted within the physical environment;
- wherein determining the environmental change comprises detecting the user has performed a first gesture associated with the environmental change, wherein the performed first gesture has a predefined relationship with the one or more augmented reality effects that are depicted within the physical environment;
wherein the one or more augmented reality effects depict (i) a time of day, (ii) a weather condition, and (iii) a physical location.

7. The system of claim 6, the operation further comprising:
- controlling a second one or more environmental devices within the physical environment, wherein the second one or more environmental devices comprise one or more illumination devices within the physical environment.

8. The system of claim 7, wherein controlling the second one or more environmental devices comprises adjusting an illumination level of the one or more illumination devices based on an illumination level depicted at an initial playback event within the interactive game.

9. The system of claim 7, wherein controlling the second one or more environmental devices comprises activating or deactivating the one or more illumination devices based on an illumination level depicted at an initial playback event within the interactive game.

10. The system of claim 7, wherein controlling the second one or more environmental devices comprises adjusting a coloration of one or more illumination devices based on a coloration depicted at an initial playback event within the interactive game.

11. The system of claim 6, wherein the first one or more environmental devices comprise one or more temperature control devices within the physical environment, wherein controlling the first one or more environmental devices comprises adjusting a temperature level of the one or more temperature control devices, and wherein the desired change comprises the physical environment reaching a predefined temperature.

12. The system of claim 6, further comprising:
- determining the first one or more environmental devices as being available within the physical environment, including using infrared light to detect the first one or more environmental devices as being available, wherein controlling the first one or more environmental devices comprises using radio frequency signals to communicate with the first one or more environmental devices.

13. The system of claim 6, the operation further comprising:
controlling a second one or more environmental devices within the physical environment, wherein the second one or more environmental devices comprise one or more audio devices within the physical environment, and wherein controlling the second one or more environmental devices comprises transmitting an audio effect for playback using the one or more audio devices, wherein the audio is scheduled to be played at a first moment in time by a first audio device and at a second moment in time by a second audio device.

14. The system of claim 13, wherein the audio is scheduled to be played at the first and second moments in time by the first and second audio devices based on a location of a user in the physical environment.

15. A non-transitory computer-readable medium containing computer program code that, when executed, performs an operation to integrate environmental devices into a play experience to synchronize changes in physical and virtual environments, the operation comprising:
determining that an initial playback event is occurring within an interactive game;
determining an environmental change in the interactive game that will occur during a specified playback event within the interactive game, prior to the specified playback event occurring within the interactive game, wherein the environmental change is to be depicted in one or more frames displayed during the specified playback event;
determining an amount of time before the specified playback event is to occur, wherein the amount of time is sufficient to permit a first one or more environmental devices to at least substantially effect a desired change in the physical environment before the specified playback event occurs; and
during the initial playback event within the interactive game, at least substantially effecting the desired change in the physical environment synchronously with the environmental change in the interactive game, by controlling, by operation of one or more computer processors when executing the computer program code, the first one or more environmental devices based on the amount of time.

16. The non-transitory computer-readable medium of claim 15, wherein the first one or more environmental devices within the physical environment are controlled in a synchronized fashion with one or more augmented reality effects that are depicted within the physical environment.

17. The non-transitory computer-readable medium of claim 16, wherein the interactive game comprises augmented reality game content, wherein determining the environmental change comprises detecting a user has performed a first gesture associated with the environmental change, wherein the performed first gesture has a predefined relationship with the one or more augmented reality effects that are depicted within the physical environment.

18. The non-transitory computer-readable medium of claim 17, wherein the one or more augmented reality effects depict at least one of (i) a time of day, (ii) a weather condition and (iii) a physical location.

19. A computer-implemented method to integrate environmental devices into a play experience to synchronize changes in physical and virtual environments, the computer-implemented method comprising:
determining that an initial playback event is occurring within an interactive game;
determining an environmental change in the interactive game that will occur during a specified playback event within the interactive game, prior to the specified playback event occurring within the interactive game, wherein the environmental change is to be depicted in one or more frames displayed during the specified playback event;
determining an amount of time before the specified playback event is to occur, wherein the amount of time is sufficient to permit a first one or more environmental devices to at least substantially effect a desired change in the physical environment before the specified playback event occurs; and
during the initial playback event within the interactive game, at least substantially effecting the desired change in the physical environment synchronously with the environmental change in the interactive game, by controlling, by operation of one or more computer processors, the first one or more environmental devices based on the amount of time.

20. The computer-implemented method of claim 19, wherein the first one or more environmental devices within the physical environment are controlled in a synchronized fashion with one or more augmented reality effects that are depicted within the physical environment.

* * * * *

UNITED STATES PATENT AND TRADEMARK OFFICE
CERTIFICATE OF CORRECTION

| | |
|---|---|
| PATENT NO. | : 11,311,804 B2 |
| APPLICATION NO. | : 16/781819 |
| DATED | : April 26, 2022 |
| INVENTOR(S) | : Michael P. Goslin et al. |

It is certified that error appears in the above-identified patent and that said Letters Patent is hereby corrected as shown below:

In the Specification

In Column 8, Line 40, delete "2301" and insert -- $230_1$ --.

In Column 8, Line 44, delete "2302" and insert -- $230_2$ --.

In Column 9, Line 60, delete "2301" and insert -- $230_1$ --.

In the Claims

In Column 24, Line 47 (Approx.), in Claim 1, delete "came;" and insert -- game; --.

In Column 24, Line 53 (Approx.), in Claim 1, delete "chance" and insert -- change --.

In Column 26, Line 28, in Claim 7, delete "claim 6," and insert -- claim 1, --.

In Column 26, Line 51, in Claim 11, delete "claim 6," and insert -- claim 1, --.

In Column 26, Line 59, in Claim 12, delete "claim 6," and insert -- claim 1, --.

In Column 27, Line 1, in Claim 13, delete "claim 6," and insert -- claim 1, --.

Signed and Sealed this
Fourth Day of October, 2022

Katherine Kelly Vidal
*Director of the United States Patent and Trademark Office*